United States Patent
Hard

(10) Patent No.: US 8,978,519 B2
(45) Date of Patent: Mar. 17, 2015

(54) TIRE CHAIN INSTALLATION RAMP

(71) Applicant: Hi-Tec Plastics Inc., Denver, CO (US)

(72) Inventor: Louis Hard, Denver, CO (US)

(73) Assignee: Hi-Tec Plastics, Inc., Denver, CO (US)

( * ) Notice: Subject to any disclaimer, the term of this patent is extended or adjusted under 35 U.S.C. 154(b) by 201 days.

(21) Appl. No.: 13/649,690

(22) Filed: Oct. 11, 2012

(65) Prior Publication Data

US 2013/0087021 A1   Apr. 11, 2013

Related U.S. Application Data

(60) Provisional application No. 61/545,654, filed on Oct. 11, 2011.

(51) Int. Cl.
*B60C 27/06* (2006.01)
*B60C 27/00* (2006.01)

(52) U.S. Cl.
CPC .................................. *B60C 27/003* (2013.04)
USPC ....................................... 81/15.8; 152/213 R

(58) Field of Classification Search
CPC ...... B25B 27/22; B60C 27/00; B60C 27/003; B60C 27/06; B66F 7/243; B60S 13/00
USPC .................... 81/15.8; 152/88, 213 R; 14/69.5
See application file for complete search history.

(56) References Cited

U.S. PATENT DOCUMENTS

| | | |
|---|---|---|
| 1,189,632 A | 7/1916 | Seitz |
| 3,893,500 A | 7/1975 | Planz |
| 3,937,263 A | 2/1976 | Hill et al. |
| 4,031,939 A | 6/1977 | De Martini |
| 4,103,870 A | 8/1978 | Murakami |
| 4,487,314 A | 12/1984 | Stewart |
| 5,033,146 A * | 7/1991 | Fogarty et al. ................. 14/69.5 |
| 5,219,466 A | 6/1993 | Stout |
| 5,279,346 A | 1/1994 | Summey |
| 5,297,605 A | 3/1994 | Littell |
| 5,400,846 A | 3/1995 | Bowman |
| D357,790 S | 4/1995 | McMillan |
| D365,908 S | 1/1996 | Pesznecker |
| D366,860 S | 2/1996 | Huffnagle |
| 6,135,420 A | 10/2000 | Johnston et al. |
| 6,148,887 A | 11/2000 | Ahne |
| D444,286 S | 6/2001 | Ahne |
| 6,263,554 B1 | 7/2001 | Lyne, Jr. |
| 6,863,101 B2 | 3/2005 | Airoldi |
| 7,165,477 B2 | 1/2007 | Lyne, Jr. |
| 8,127,389 B1 * | 3/2012 | Hannam ........................ 14/69.5 |

* cited by examiner

*Primary Examiner* — Hadi Shakeri

(74) *Attorney, Agent, or Firm* — Swanson & Bratschun, L.L.C.

(57) ABSTRACT

A tire chain installation ramp that may be easily assembled and disassembled without the use of tools. The tire chain installation ramp comprises a set of multiple lengthwise plates and a set of multiple crosswise plates. The lengthwise and crosswise plates are configured to interlock with each other to form a grid-style ramp suitable for supporting a tire off of the road surface as a tire chain is installed. After use, the lengthwise and crosswise plates may be disassembled, stacked face to face and conveniently stored in a space which is smaller in volume than the assembled ramp. An alternative embodiment is a tire chain installation kit comprising a ramp which can be assembled from lengthwise and crosswise plates as described above, plus a storage container. Another alternative embodiment is a method of installing or removing a tire chain. Including providing a tire chain installation ramp or tire chain installation kit as described above.

5 Claims, 3 Drawing Sheets

TIRE CHAIN INSTALLATION RAMP

RELATED APPLICATION DATA

The instant application claims benefit of U.S. Provisional Patent Application No. 61/545,654, filed Oct. 11, 2011, which application is incorporated herein by reference in its entirety.

TECHNICAL FIELD

The embodiments disclosed herein are directed toward a tire chain installation ramp, a tire chain installation ramp kit and method of installing a tire chain. The disclosed embodiments are more particularly directed toward a tire chain installation ramp which may be disassembled for convenient storage in a confined space and easily reassembled for use.

BACKGROUND

It is often desirable to install tire chains on the drive wheels of a truck, automobile or other vehicle before traveling over snow or ice. Tire chains grip the snow and ice and provide better traction than would be available without the use of tire chains.

Unfortunately, it is inadvisable or dangerous to drive a truck or other vehicle on dry pavement with tire chains installed. Therefore, it is necessary to install and uninstall tire chains as the winter weather and road conditions change. Tire chain installation can be a difficult, time consuming and in the case of a commercial trucking operation, a costly process.

Various ramps are known in the prior art which are designed to lift a vehicle tire off of the road surface to facilitate the installation of tire chains. Known ramps are typically large and bulky apparatus. These known ramps are difficult to conveniently store in a confined space onboard a truck or car. For example, known ramps would be difficult or impossible to store under the seat of a truck or automobile. The embodiments disclosed herein are directed toward overcoming one or more of the problems discussed above.

SUMMARY OF THE EMBODIMENTS

One embodiment disclosed herein is a tire chain installation ramp that may be easily assembled and disassembled without the use of tools. The tire chain installation ramp comprises a set of multiple lengthwise plates and a set of multiple crosswise plates. The lengthwise and crosswise plates are configured to interlock with each other to form a grid-style ramp suitable for supporting a tire off of the road surface as a tire chain is installed. In some instances, the chain may be installed on the tire on the ramp. In other instances, the chain may be installed on an adjacent tire. After use, the lengthwise and crosswise plates may be simply disassembled, stacked face to face and conveniently stored in a space which might be much smaller in volume than the assembled ramp. Thus, in a storage configuration, the disassembled ramp elements may be configured into a storage package that has an overall size which is substantially less than the size of the assembled ramp.

One particular embodiment of the tire chain installation ramp includes more than one lengthwise plates with each lengthwise plate having top and bottom surfaces and a substantially flat front and back face. A plurality of open connection slots are defined within each lengthwise plate. The slots extend through the front and back face from either the bottom surface toward, but not to, the top surface of a given plate. Alternatively, the connection slots may extend through the front and back faces from the top surface toward but not to the bottom surface of the lengthwise plate.

The multiple crosswise plates of this embodiment are similarly outfitted with a plurality of open connection slots extending from either the top down toward the bottom of a given crosswise plate or extending from the bottom up toward the top of the crosswise plate. Either type of plate may have upward or downward facing slots, or both. Typically, the connection slots will have a slot width which is very slightly greater than the thickness of the lengthwise and crosswise plates. Thus, a grid-type ramp may be assembled by interlinking the lengthwise plates and crosswise plates to form the tire installation ramp.

In one embodiment the crosswise plates have a rectangular face shape. In this embodiment the lengthwise plates may have a face which is shaped as an isosceles trapezoid with the bottom surface corresponding to the longer trapezoid base and the top surface corresponding to the shorter trapezoid base. Thus, the angled sides of the trapezoid correspond to ramp surfaces. In use, the lengthwise plates are oriented along the direction of vehicle travel (perpendicular to the vehicle axles) such that a tire may be driven or rolled to the top surface of a ramp where tire chain installation or removal may commence.

In some embodiments, each lengthwise plate and each crosswise plate will have substantially equivalent height between respective bottom and top surfaces. In an alternative embodiment one crosswise plate, typically placed at one end of the top surface of the ramp, will have a greater height when compared to the other crosswise plates. In this embodiment the crosswise plate having a greater height creates a tire stop.

In some embodiments the bottom surface of one or more selected lengthwise or crosswise plates may have a toothed, scalloped or otherwise structured surface to provide a grip surface or structure for snow and ice and thus prevent the ramp from sliding in use.

An alternative embodiment is a tire chain installation kit comprising a ramp which can be assembled from lengthwise and crosswise plates as described above, plus a storage container. In this embodiment the storage container can be a bag, case, rack, tray, one or more straps or an alternative storage container sized to receive and hold each lengthwise plate and each crosswise plate in a disassembled configuration where the plates are stacked with the faces of adjacent plates against each other.

An alternative embodiment is a method of installing or removing a tire chain. The method includes providing a tire chain installation ramp or tire chain installation kit as described above. The method further includes assembling a grid-type tire chain installation ramp from separate lengthwise and crosswise plates which are interlinked by the engagement of multiple connection slots within adjacent lengthwise and crosswise plates. The ramp may then be placed upon a surface and a vehicle tire may be driven, rolled or otherwise placed onto the top surface of the ramp. A tire chain may then be installed on or removed from that tire or an associated tire.

DETAILED DESCRIPTION

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Figure 1:
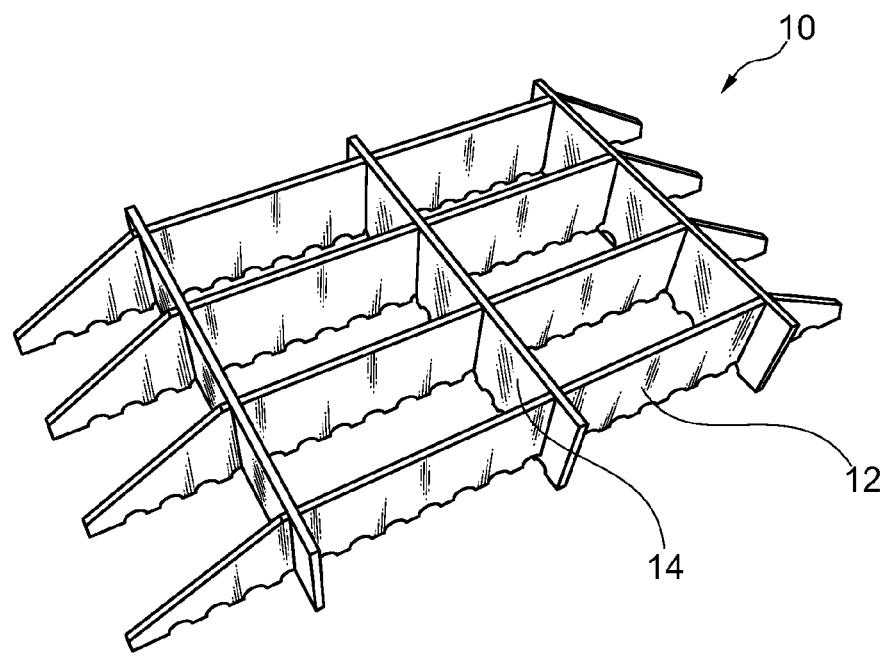
FIG. 1 is a perspective view of a tire chain assembly ramp as disclosed herein in the assembled configuration.
Figure 2:
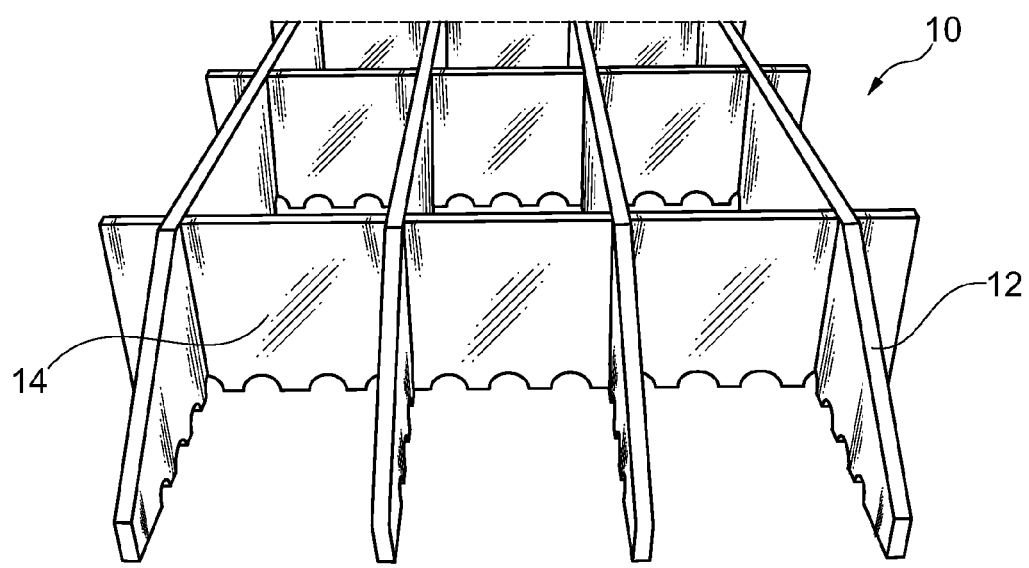
FIG. 2 is a side perspective view of a tire chain installation ramp in the assembled configuration.

FIG. 1 is a perspective view of a tire chain installation ramp 10 as disclosed herein. FIG. 2 is an end perspective view of the tire chain installation ramp 10 and FIGS. 3 and 4 are plan views of various plates which can be selectively assembled to prepare the tire chain installation ramp for use.

The illustrated tire chain installation ramp 10 is comprised of a plurality of lengthwise plates 12a, 12b 12c and 12d and crosswise plates 14a, 14b, and 14c. The embodiment of FIGS. 1-4 includes four lengthwise plates 12 and three crosswise plates 14, but this number of plates is not limiting. Alternative embodiments could include a greater or lesser number of lengthwise or crosswise plates as required to achieve specific load bearing requirements, to minimize the storage size of the tire installation ramp 10 in the storage configuration or to achieve other design goals.

Figure 3:
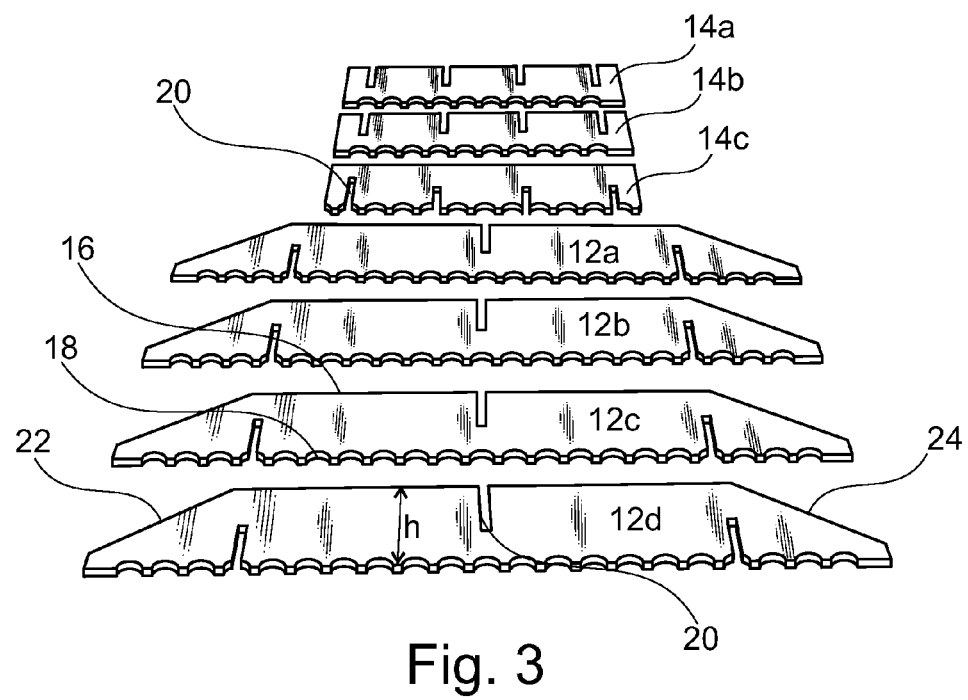
FIG. 3 is a top plan view of the three crosswise plates and four lengthwise plates of the ramp of FIGS. 1 and 2 in a disassembled configuration.
Figure 4:
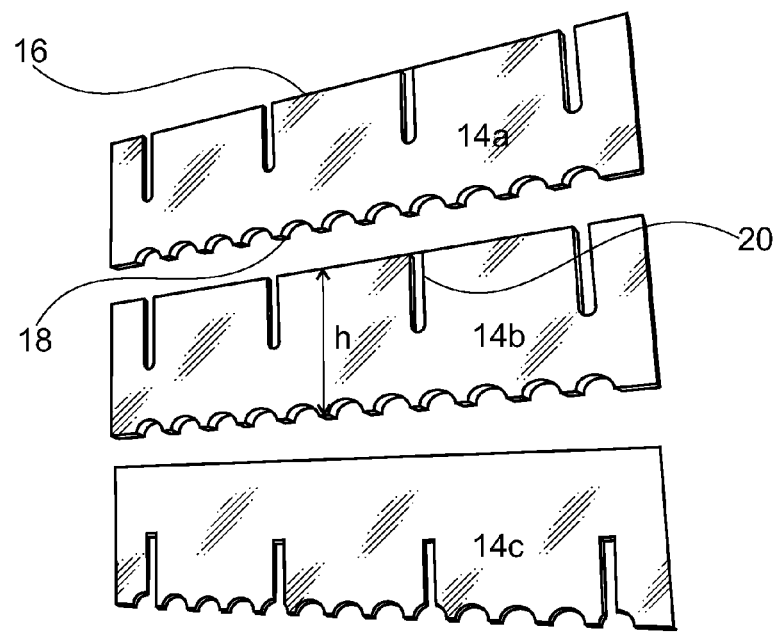
FIG. 4 is a close-up plane view of the crosswise plates of FIG. 3.

As is best viewed in FIGS. 3 and 4 each lengthwise plate 12 and crosswise plate 14 has a top surface 16 and bottom surface 18. In between the top surface and bottom surface of a given plate is a height shown as h on FIG. 3 and FIG. 4. Each of the lengthwise plates 12 and crosswise plates 14 is a "plate" according to the common definition of, for example, a metal plate. In particular, each of these members has substantially flat front and back faces and a substantially uniform thickness which is less than the overall length or height of a given member. Thus, the lengthwise plates 12 and crosswise plates 14 may be conveniently fabricated from metal, high strength plastic or composite materials which are provided as bar or sheet stock having a suitable width, length and thickness.

As is also best shown on FIGS. 3 and 4 each lengthwise plate 12 and crosswise plate 14 will include one or more open connection slots 20. Any particular open connection slot 20 may extend from either the bottom surface 18 of a lengthwise or crosswise plate toward, but not to the top surface 16 of the plate. Alternatively, a connection slot 20 could extend from the top surface 16 of a plate toward but not to the bottom surface 18 of the plate. As shown in FIGS. 3 and 4 the connection slots 20 are arranged at regular intervals along a length of each lengthwise plate 12 or crosswise plate 14. Typically, a lengthwise plate 12 will have at least a number of slots equal to the number of crosswise plates 14 used to assemble a ramp 10. Similarly, a crosswise plate 14 will typically have at least a number of slots equal to the number of lengthwise plates 12 used for a given assembled ramp configuration.

In addition, as is shown with particularity in FIG. 3, the orientation of the connection slots 20 in a given lengthwise or crosswise plate is selected to provide for the convenient and structurally sound interlinking or engagement of corresponding connection slots 20 when mating lengthwise and crosswise plates to assemble a tire chain installation ramp 10 into a ready to use configuration. Thus, selected plates may have slots that open at the top, while other plates may have slots that open at the bottom. Certain plates may have both slots that open at the top and slots that open at the bottom. For example, as shown in FIG. 3, crosswise plates 14a and 14b have four upward facing connection slots 20 per plate, which in use mate with the downward facing connection slots 20 of lengthwise plates 12a-d located at the left and right sides of each lengthwise plate.

On the contrary, crosswise member 14c has downward facing slots which correspond to and in use mate with, the upward facing slots of lengthwise plates 12a-d located at the center of each plate. Therefore, to assemble the ramp 10 into a use configuration as illustrated in FIGS. 1-2, each lengthwise plate 12a-d can be placed into engagement with crosswise plates 14a and 14b from the top. Then crosswise plate 14c can be placed into engagement with lengthwise plates 12a-d, also from the top. Other engagement strategies or plate configurations are within the scope of the present disclosure, provided the plates can be assembled into a structurally sound use configuration without the use of tools.

When assembled for use as described above the various plates form the tire chain installation ramp 10 form a strong interlocked grid of vertically oriented plates configured to bear a heavy load. The rigidity of the assembled grid can be enhanced by providing connection slots 20 which have a width which is only slightly greater than the uniform thickness of the lengthwise plates 12 or crosswise plates 14. For example the slots 20 may have a width that is less than or equal to 1/16 or 1/32 or 1/64 inch greater than the thickness of the lengthwise plates 12 or crosswise plates 14.

The crosswise plates 14 may have a substantially rectangular shape when viewed toward a front or back face. On the contrary, each lengthwise plate may have an isosceles trapezoidal shape when viewed toward a front or back face with the bottom surface 18 corresponding to the longer trapezoid base and the top surface 16 corresponding to the shorter trapezoid base. In this manner the trapezoid sides 22 and 24 define ramped surfaces which slope from the bottom to the top of the ramp when the plates are configured for use, thus providing for convenient placement of a tire upon the assembled ramp.

Figure 5:
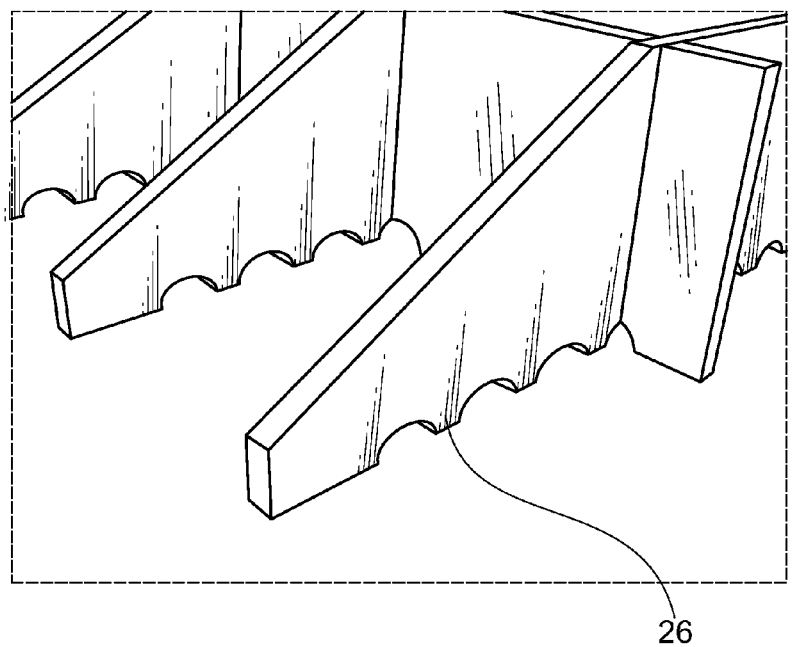
FIG. 5 is a close-up perspective view of one corner of an assembled tire chain installation ramp showing a toothed bottom surface.

As shown in FIGS. 1-4 and shown with more particularity in FIG. 5, the bottom surface of one or more selected lengthwise or crosswise plates may be carved, machined, molded or otherwise formed into a series of teeth 26, scalloped portions, points, irregularities or other structures to provide a positive no-slip gripping surface between the assembled tire chain installation ramp 10 and an ice or snow covered roadway when the ramp is being used.

In some embodiments, each lengthwise plate and each crosswise plate will have substantially equivalent height h between respective bottom and top surfaces. In an alternative embodiment one crosswise plate, typically placed at one end of the top surface of the ramp, will have a greater height when compared to the other crosswise plates. In this embodiment the crosswise plate having a greater height creates a tire stop.

As shown in FIG. 1, the tire chain installation ramp 10, when assembled for use, has a relatively large size which includes a significant amount of void space between adjacent lengthwise and crosswise plates. Thus, when assembled for use the tire chain installation ramp 10 is potentially too large for convenient storage in a confined space, for example under the seat of a truck or automobile.

Figure 6:
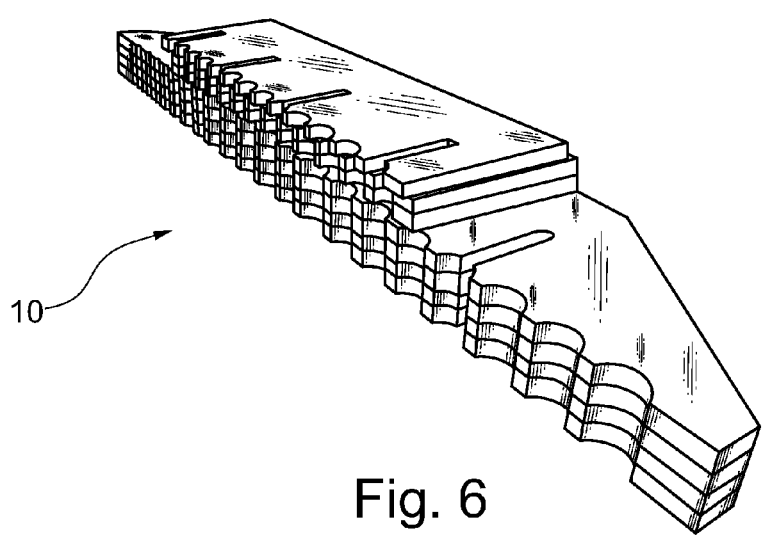
FIG. 6 is a perspective view of the tire chain installation ramp in a disassembled storage configuration.

As shown in FIG. 6, the tire chain installation ramp 10 may be disassembled and the various plates stacked face to face for storage. In this storage configuration, the tire chain installation ramp 10 takes up significantly less storage space and can typically fit into a confined area such as the space underneath a truck or automobile seat. Thus, a further embodiment is a tire chain installation kit 28, including a tire chain installation ramp as described above, plus a storage container sized to receive each lengthwise and crosswise plate when disassembled and placed into a storage configuration. The storage container can be a bag, case, rack, tray, one or more straps or an alternative storage container sized to receive and hold each lengthwise plate and each crosswise plate in a disassembled configuration.

An alternative embodiment disclosed herein is a method of installing or removing a tire chain. The method includes providing a tire chain installation ramp as described above. As noted above, the tire chain installation ramp will be assembled as a grid of interlocking lengthwise and crosswise plates. Thus, the method includes the step of interlocking multiple plates by the engagement of adjacent connection slots over each other to form a ramp. The method further includes placing the ramp upon a road, parking lot or other drive surface and driving a vehicle tire onto the top surface of the ramp. Proper centering of the tire may be aided by engaging the tire with an optional tire stop formed by one crosswise plate having a height greater than adjacent plate. A tire chain may then be installed on the tire or an associated tire. In embodiments where the tire chain is to be installed on the tire placed on the ramp, it may be necessary to lay the tire chain along the top surface of the ramp prior to rolling or driving a tire onto the ramp for the installation process. Alternatively, in the case of a truck with dual left and dual right drive tires, the ramp may be placed in front of an inner tire, the inner tire may then be driven onto a top surface of the ramp and a tire chain may be installed on the associated outer tire. After a suitable tire chain has been installed on the selected tire, the tire and chain may be driven in reverse (or forward if no tire stop is provided) off of the ramp. The ramp may then be disassembled for storage.

When road conditions or weather conditions change and tire chains are no longer required, the tire chain installation ramp 10 may be reassembled and the above steps may be repeated to conveniently remove the previously installed tire chains for future use.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A tire chain installation ramp comprising:
   a plurality of lengthwise plates with each lengthwise plate comprising a top surface, a bottom surface and substantially flat front and back faces and further comprising a plurality of open connection slots defined within each lengthwise plate extending through the front and back faces from either the bottom surface of the lengthwise plate toward, but not to, the top surface of the lengthwise plate or extending through the front and back faces from the top surface of the lengthwise plate toward, but not to, the bottom surface of the lengthwise plate, each lengthwise plate comprises an isosceles trapezoidal shape with the bottom surface corresponding to the longer trapezoid base and the top surface corresponding to the shorter trapezoid base;
   a plurality of substantially rectangular crosswise plates with each crosswise plate comprising a top surface, a bottom surface and substantially flat front and back faces and further comprising a plurality of open connection slots defined within each crosswise plate extending through the front and back faces from either the bottom surface of the crosswise plate toward, but not to, the top surface of the crosswise plate or extending through the front and back faces from the top surface of the crosswise plate toward, but not to, the bottom surface of the crosswise plate; wherein multiple lengthwise plates are configured to be interlinked with multiple crosswise plates by the engagement of adjacent connection slots over each other to form a ramp comprised of a grid of multiple lengthwise plates and multiple crosswise plates;
   the plurality of lengthwise plates and the plurality of crosswise plates have substantially the same uniform thickness and the open connection slots defined within each type of plate has an opening width which is no more than $1/16$ inch greater than the plate thickness; and
   the grid of multiple lengthwise plates and multiple crosswise plates comprises lengthwise and crosswise plates in a substantially vertical orientation that are interconnected only by the engagement of adjacent connection slots over each other with no other connecting structures.

2. The tire chain installation ramp of claim 1 wherein each lengthwise plate and each crosswise plate has a substantially equivalent height between respective bottom surfaces and top surfaces.

3. The tire chain installation ramp of claim 1 wherein one crosswise plate corresponding to a tire stop has a height greater than the other crosswise plates.

4. The tire chain installation ramp of claim 1 wherein the bottom surface of one or more selected lengthwise plates and crosswise plates is a toothed surface.

5. A method of installing a tire chain comprising:
   providing a plurality of lengthwise plates with each lengthwise plate comprising a top surface, a bottom surface and substantially flat front and back faces and further comprising a plurality of open connection slots defined within each lengthwise plate extending through the front and back faces from either the bottom surface of the lengthwise plate toward, but not to, the top surface of the lengthwise plate or extending through the front and back faces from the top surface of the lengthwise plate toward, but not to, the bottom surface of the lengthwise plate, each lengthwise plate comprises an isosceles trapezoidal shape with the bottom surface corresponding to the longer trapezoid base and the top surface corresponding to the shorter trapezoid base;

providing a plurality of substantially rectangular crosswise plates with each crosswise plate comprising a top surface, a bottom surface and substantially flat front and back faces and further comprising a plurality of open connection slots defined within each crosswise plate extending through the front and back faces from either the bottom surface of the crosswise plate toward, but not to, the top surface of the crosswise plate or extending through the front and back faces from the top surface of the crosswise plate toward, but not to, the bottom surface of the crosswise plate; the plurality of lengthwise plates and the plurality of crosswise plates have substantially the same uniform thickness and the open connection slots defined within each type of plate has an opening width which is no more than 1/16 inch greater than the plate thickness; and the grid of multiple lengthwise plates and multiple crosswise plates comprises lengthwise and crosswise plates in a substantially vertical orientation that are interconnected only by the engagement of adjacent connection slots over each other with no other connecting structures;

interlinking multiple crosswise plates with multiple lengthwise plates by the engagement of adjacent connection slots over each other to form a ramp of multiple lengthwise plates and multiple crosswise plates; placing the ramp upon a surface;

driving a vehicle tire onto a top surface of the ramp; and installing a tire chain on the tire or an associated second tire.

* * * * *